Sept. 7, 1954 J. W. DICKEY 2,688,247
FREEZE-TESTER

Filed May 31, 1952 2 Sheets-Sheet 1

WITNESS:
Esther M. Stockton

INVENTOR.
John W. Dickey
BY
Clinton L. Janes
ATTORNEY

Sept. 7, 1954　　　　J. W. DICKEY　　　　2,688,247
FREEZE-TESTER
Filed May 31, 1952　　　　　　　　　　　2 Sheets-Sheet 2
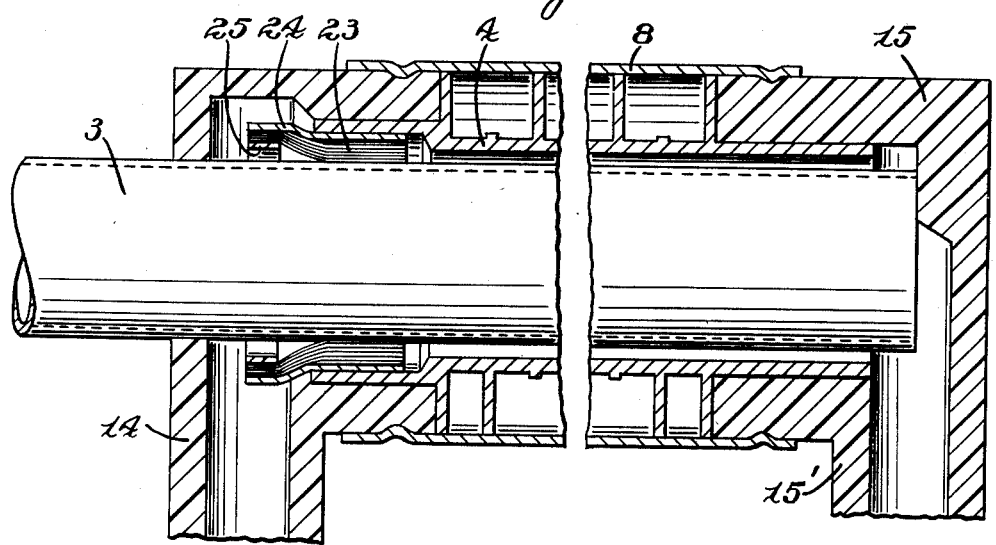
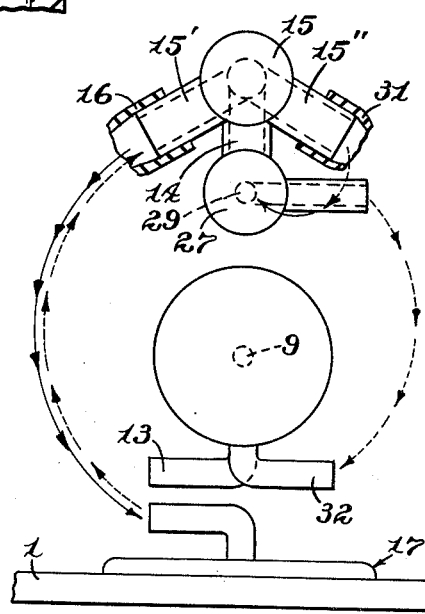
WITNESS:　　　　　　　　　　　　　INVENTOR.
　　　　　　　　　　　　　　　　　John W. Dickey
　　　　　　　　　　　　　　BY
　　　　　　　　　　　　　　　　　　ATTORNEY Patented Sept. 7, 1954

2,688,247

UNITED STATES PATENT OFFICE 2,688,247

FREEZE-TESTER

John W. Dickey, Newfield, N. Y., assignor to Bendix Aviation Corporation, Elmira Heights, N. Y., a corporation of Delaware Application May 31, 1952, Serial No. 290,924

4 Claims. (Cl. 73—17)

1

The present invention relates to a freeze-tester for engine coolants and the like and more particularly to a device for determining with accuracy the lowest temperature at which the liquid to be tested is free from ice crystals.

This device is an improvement in the structure disclosed in the application of Dickey and Hood, Ser. No. 274,252, filed February 29, 1952, now Patent No. 2,635,458, and assigned to the assignee of the present application.

Said Dickey et al. application discloses a device for determining the thawing point of a liquid by freezing a small sample in intimate contact with a thermometer stem, placing the sample under a constant pressure tending to eject it, allowing it to thaw and determining the temperature at which the slush emerges from the freezing tube in response to said pressure. In some cases it has been desired to determine the lowest temperature at which the liquid is free from ice crystals, and the present disclosure is directed to apparatus for making such a determination.

It is an object of the present invention to provide a novel freeze-tester employing a device for trapping and holding the ice crystals in the frozen sample and preventing the sample from flowing out of the freezing tube until substantially all the crystals have melted.

It is another object to provide such a device in which the crystal trap is arranged to offer very little resistance to the passage of liquid through the freezing tube while drawing the sample, but which expands so as to form an effective filter or trap when the flow of the sample is reversed.

It is another object to provide such a device incorporating a manually controlled bypass which, when open, permits free discharge of the liquid from the instrument.

Further objects and advantages will be apparent from the following description taken in connection with the accompanying drawing in which:

Fig. 2 is an enlarged sectional detail of a portion of the freezing tube with the crystal trap installed in the inlet end of the tube;

Fig. 3 is a semi-diagrammatic end view of a portion of the circulating system showing the flow path of the sample as drawn and as ejected from the instrument.

Figure 1:
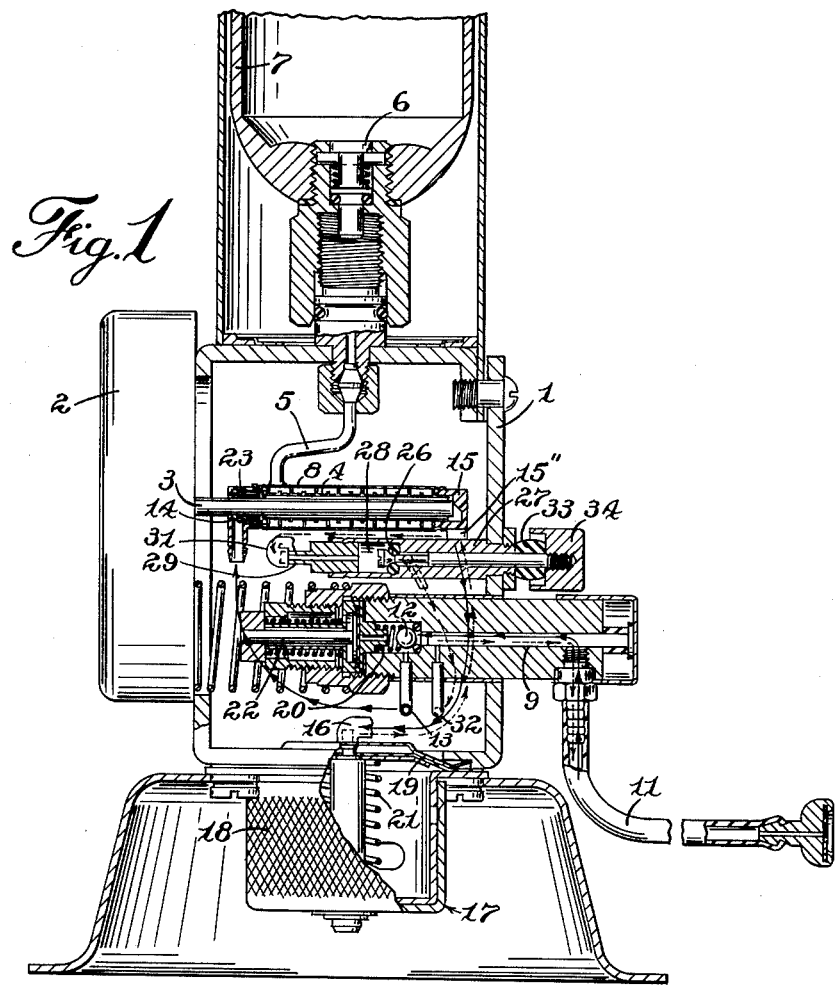
Fig. 1 is a side elevation, partly broken away and in section, of a freeze-tester embodying the present invention.

In Fig. 1 of the drawing there is illustrated a freeze-tester having a body or frame 1 on which

2 a thermometer 2 is mounted with its cylindrical stem 3 extending within the casing. A finned freezing tube 4 surrounds the thermometer stem 3 and is connected by a tube 5 through a manually operable valve 6 to a flask or cylinder 7 containing liquefied carbon dioxide under pressure. A shield 8 to which the tube 5 is attached surrounds the freezing tube 4 so as to bring the freezing gas released from the flask 7 into contact with the freezing tube to thereby quickly cool the tube.

Means for drawing a sample of liquid to be tested into and through the freezing tube 4 is provided comprising an inlet conduit 9 to which a flexible hose 11 is attached, the free end of which may be inserted in the container of liquid to be tested. Liquid entering through conduit 9 passes by a check valve 12 and tubing 13 to an inlet fitting 14 suitably attached to the end of the freezing tube 4 as indicated in Fig. 2. The opposite end of the freezing tube is provided with an outlet fitting 15 having two nipples 15' and 15''. The nipple 15' is connected by a tube 16 to a manually operable pump indicated generally by numeral 17. This pump is arranged so that rotation of the knurled outer sleeve 18 thereof retracts a diaphragm 19 against the pressure of a spring 21, thus drawing the sample through the freezing tube into the pump. When the sleeve 18 is returned to its normal position, the spring 21 is permitted to act on the diaphragm 19, producing a pressure tending to eject the sample. Such pressure, when transmitted back through the freezing tube 4 and tubing 13 to the chamber 20 which contains the check valve 12, triggers a magnetic arresting means for the thermometer indicated generally by numeral 22.

This structure is completely described in the Dickey and Hood application above cited and forms no part of the present invention, so that further description thereof is deemed unnecessary.

According to the present invention, means are provided for preventing the ejection of the sample from the freezing tube 4 as long as there are ice crystals remaining in the sample within the freezing tube. As here shown this means is in the form of a sleeve or skirt 23 formed of textile threads in substantially parallel relation surrounding the stem 3 of the thermometer at the inlet end of the freezing tube. The outer ends of the threads are compacted between an outer sleeve 24 and an inner ring 25, as shown in Fig. 2, and are preferably anchored and united by means of a suitable adhesive. The sleeve 24 fits snugly in the end of the freezing tube 4, while the ring 25 is spaced from the thermometer stem 3, permitting the flow of sample through the ring.

The inward flow of the sample causes the threads of the skirt to stream out and offer little resistance to the flow of the liquid, but movement of the sample in the opposite direction causes the threads to fluff out and hold any ice crystals remaining in the sample, thereby preventing such reverse flow until the crystals have melted.

In view of this increased resistance to backward flow through the freezing tube 4 which is offered by the crystal trap 23, it has been found desirable to provide a bypass around the crystal trap and freezing tube to permit free discharge of the sample at the conclusion of the test. For this purpose, a manually operable valve 26 is located in a cylindrical fitting 27 mounted in the side of the frame 1. This fitting has a chamber 28 provided with an inlet nipple 29 which is connected by tubing 31 to the nipple 15″ of outlet fitting 15 of the freezing tube, and by tube 32 to the inlet conduit 9. Valve 26 is normally held closed by a block 33 of rubber or the like and is releasable by manual pressure on the knob 34.

In the operation of the instrument, the inlet hose 11 is introduced into the container of liquid to be tested, and the sleeve 18 of pump 17 rotated to draw the sample through the freezing tube 4, the path of the sample through conduit 9, check valve 12, tubing 13, freezing tube 4, and tube 16 to the pump 17 being indicated by the continuous line of arrows in Figs. 1 and 3. The valve 6 of the carbon dioxide cylinder is then opened, and the escaping gas at low temperature is conducted through the duct 5 into the shield 8 around the freezing tube 4, causing the liquid therein to be quickly frozen. The pump sleeve 18 is then released, permitting the spring 21 to apply pressure to the sample tending to eject it from the freezing tube. The sample is thereupon permitted to melt.

Backward flow of the sample from the freezing tube 4 is prevented by the crystal trap 23 as long as frozen slush remains in the trap. When the ice crystals melt, backward flow takes place and the pressure so developed in the chamber 20 triggers the magnetic arresting means 22 for the thermometer as set forth in the Dickey and Hood application, thus recording the lowest temperature at which the sample is free from ice crystals.

Thereafter the sample is released by manual pressure on the valve knob 34, the path of flow through the nipple 15″ of outlet fitting 15, tubing 31, valve chamber 28, tubing 32, and conduit 9 being indicated in Figs. 1 and 3 by the broken arrow lines. The crystal trap 23 may be flushed out and a new sample introduced by repeated operation of the pump 17 and bypass valve 26.

Although but one embodiment of the invention has been shown and described in detail, it will be understood that other embodiments are possible and changes may be made in the precise form of the crystal trap and related elements illustrated without departing from the spirit of the invention.

I claim:

1. In an instrument for determining the melting point of a liquid, a thermometer having a cylindrical stem, a freezing tube surrounding the stem in spaced relation thereto, means for drawing a sample of the liquid through the freezing tube, means for cooling said tube till the liquid therein is frozen, means for placing a predetermined pressure on the sample tending to reverse its flow through the freezing tube, and a crystal trap located at the inlet end of the freezing tube, comprising a one-way filtering unit arranged to freely admit the liquid sample to the freezing tube but to oppose the outflow of slush therefrom.

2. In an instrument for determining the melting point of a liquid, a thermometer having a cylindrical stem, a freezing tube surrounding the stem in spaced relation thereto, means for drawing a sample of the liquid through the freezing tube, means for cooling said tube till the liquid therein is frozen, means for placing a predetermined pressure on the sample tending to reverse its flow through the freezing tube, and a crystal trap comprising a skirt of textile fibres anchored and united in the annular opening between the thermometer stem and the freezing tube at the inlet end of the tube, so as to stream out and offer little resistance to the inward passage of liquid therethrough, but to fluff out and oppose the efflux of slush.

3. An instrument as set forth in claim 2 including further a manually operable bypass around the crystal trap for freely discharging the sample of liquid.

4. An instrument, as set forth in claim 3, in which the means for drawing the sample of liquid through the freezing tube includes an inlet conduit having a check valve, and the bypass is connected to said conduit on the inlet side of the check valve.

References Cited in the file of this patent

UNITED STATES PATENTS

| Number | Name | Date |
|---|---|---|
| 1,443,537 | Hortvet | Jan. 30, 1923 |
| 2,297,641 | Webber | Sept. 29, 1942 |
| 2,591,084 | Martin | Apr. 1, 1952 |